(12) United States Patent
Ruffner, II

(10) Patent No.: US 11,285,905 B2
(45) Date of Patent: Mar. 29, 2022

(54) AIRBAG ASSEMBLY AND METHOD

(71) Applicant: Honda Motor Co., Ltd., Tokyo (JP)

(72) Inventor: Jimmie A. Ruffner, II, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 199 days.

(21) Appl. No.: 16/696,238

(22) Filed: Nov. 26, 2019

(65) Prior Publication Data

US 2021/0155196 A1 May 27, 2021

(51) Int. Cl.
*B60R 21/237* (2006.01)
*B60R 21/21* (2011.01)
*B60R 21/2342* (2011.01)
*B60R 21/235* (2006.01)

(52) U.S. Cl.
CPC ............ *B60R 21/21* (2013.01); *B60R 21/235* (2013.01); *B60R 21/237* (2013.01); *B60R 21/2342* (2013.01); *B60R 2021/23509* (2013.01); *B60R 2021/23538* (2013.01)

(58) Field of Classification Search
CPC ........ B60R 21/21; B60R 21/37; B60R 21/213
See application file for complete search history.

(56) References Cited

U.S. PATENT DOCUMENTS

| | | | |
|---|---|---|---|
| 8,740,247 B1 | 6/2014 | Jovicevic | |
| 9,227,590 B2 * | 1/2016 | Fujiwara | ............. B60R 21/2338 |
| 9,637,081 B2 * | 5/2017 | Ryan | ........................ B60R 21/08 |
| 9,650,010 B2 | 5/2017 | Wang et al. | |
| 9,862,349 B2 | 1/2018 | Fujiwara et al. | |
| 10,071,703 B2 | 9/2018 | Ikenohata et al. | |
| 10,144,385 B2 * | 12/2018 | Alarcon Hernandez | ..................... B60R 21/23138 |
| 10,220,808 B2 * | 3/2019 | Moberg | .............. B60R 21/2334 |
| 10,351,090 B2 * | 7/2019 | Yamada | .............. B60R 21/2338 |
| 10,363,899 B2 * | 7/2019 | Ward | .................. B60R 21/2338 |
| 10,493,944 B2 * | 12/2019 | Oshima | ................... B60R 21/20 |
| 2005/0206138 A1 * | 9/2005 | Breuninger | ........... B60R 21/231 280/729 |
| 2006/0175814 A1 | 8/2006 | Jang et al. | |
| 2013/0161930 A1 * | 6/2013 | Moffitt | .................. B60R 21/232 280/730.2 |

(Continued)

FOREIGN PATENT DOCUMENTS

| | | | |
|---|---|---|---|
| EP | 2390144 A1 * | 11/2011 | ......... B60R 21/2338 |
| JP | 3928420 | 6/2007 | |

(Continued)

*Primary Examiner* — Nicole T Verley
(74) *Attorney, Agent, or Firm* — Rankin, Hill & Clark LLP

(57) ABSTRACT

A vehicle airbag assembly for a vehicle body includes an airbag having a storage position and an unfolded position, in the unfolded position the airbag features an inboard side facing an interior of the vehicle body, an outboard side facing an exterior of the vehicle body, a top portion fixed to the vehicle body, and a bottom portion located on a side of the airbag opposite the top portion. A fabric layer is adapted to overlay the outboard side of the airbag in the unfolded position, the fabric layer including a top portion and a bottom portion located on a side of the fabric layer opposite the top portion, the top portion of the fabric layer fixed to the top portion of the airbag.

12 Claims, 9 Drawing Sheets

(56) References Cited

U.S. PATENT DOCUMENTS

| | | | |
|---|---|---|---|
| 2015/0375710 A1* | 12/2015 | Sievers | B60R 21/237 |
| | | | 280/730.2 |
| 2016/0009246 A1* | 1/2016 | Ryan | B60R 21/21 |
| | | | 280/730.2 |
| 2018/0099634 A1* | 4/2018 | Ohno | B60R 21/2338 |
| 2018/0105133 A1* | 4/2018 | Ballam | B60R 21/232 |
| 2018/0111579 A1 | 4/2018 | Shimizu et al. | |
| 2018/0281740 A1 | 10/2018 | Oshima | |

FOREIGN PATENT DOCUMENTS

| | | | |
|---|---|---|---|
| JP | 3932867 B2 * | 6/2007 | |
| JP | 5754192 | 7/2015 | |
| JP | 2017043319 | 3/2017 | |
| WO | 2014061323 | 9/2016 | |
| WO | WO-2016170892 A1 * | 10/2016 | ........... B60R 21/213 |
| WO | WO-2017122435 A1 * | 7/2017 | ........... B60R 21/213 |

* cited by examiner ing object or vehicle and an occupant in the vehicle in the event of a collision. In this manner, known airbags inflate such that the occupant is cushioned from the vehicle by the inflated airbag, and protected from potentially harmful debris directed towards an interior of the vehicle. To ensure the airbag avoids puncture from debris and properly inflates, and to protect occupants from the debris, conventional airbags can include a protective layer that faces an exterior of the vehicle from the airbag when the airbag is in an actuated or deployed position.

AIRBAG ASSEMBLY AND METHOD

BACKGROUND

Airbags, particularly side airbags or curtain airbags, are configured for time effective deployment from a relatively compact position to between a corresponding In conventional airbag designs, however, the protective layer and the airbag are not incorporated with each other such that the airbag is protected from the exterior of the vehicle from an early stage of deployment of the airbag to a fully actuated position. Instead, the protective layer is disposed around the airbag which is folded or rolled into a relatively compact position for storage in the vehicle. As a result, one challenge of conventional airbags is maintaining a protective layer between the airbag and the exterior of the vehicle such that the fabric layer completely covers the side of the airbag facing the exterior of the vehicle from an early stage of deployment as the airbag unfolds or unrolls to a fully actuated position.

BRIEF DESCRIPTION

According to one aspect, a vehicle airbag assembly for a vehicle body includes an airbag having a storage position and an unfolded position, in the unfolded position the airbag features an inboard side facing an interior of the vehicle body, an outboard side facing an exterior of the vehicle body, a top portion fixed to the vehicle body, and a bottom portion located on a side of the airbag opposite the top portion. A fabric layer is adapted to overlay the outboard side of the airbag in the unfolded position, the fabric layer including a top portion and a bottom portion located on a side of the fabric layer opposite the top portion, the top portion of the fabric layer being fixed to the top portion of the airbag. When in both the storage position and the unfolded position the bottom portion of the fabric layer is fixed at a first location to the airbag, and when in the storage position the bottom portion of the fabric layer is connected at a second location to at least one of the airbag and the vehicle body.

According to another aspect, a method of providing a vehicle airbag assembly includes fixing a top portion of an airbag to a vehicle body, fixing a top portion of a fabric layer to the vehicle body such that the fabric layer faces an outboard side of the airbag with respect to the vehicle body, and fixing a bottom portion of the airbag to the fabric layer. The method also includes folding the bottom portion of the airbag upward toward the top portion of the airbag, forming a folded end portion of the airbag opposite the top portion of the airbag, folding a bottom portion of the fabric layer over the folded end portion of the airbag, forming a folded end portion of the fabric layer opposite the top portion of the fabric layer, and connecting the bottom portion of the fabric layer to at least one of an inboard side of the airbag and the vehicle body.

According to another aspect, a method of providing a vehicle airbag assembly includes fixing a top portion of an airbag to a vehicle body, and folding a bottom portion of the airbag upward toward the top portion of the airbag, placing the airbag in an intermediate storage position between a storage position and a unfolded position and forming a folded end portion of the airbag opposite the top portion of the airbag with respect to an unfolded section of the airbag, such that the bottom portion of the airbag is located between the top portion of the airbag and the folded end portion of the airbag and faces an inboard side of the airbag.

DETAILED DESCRIPTION

Figure 1:
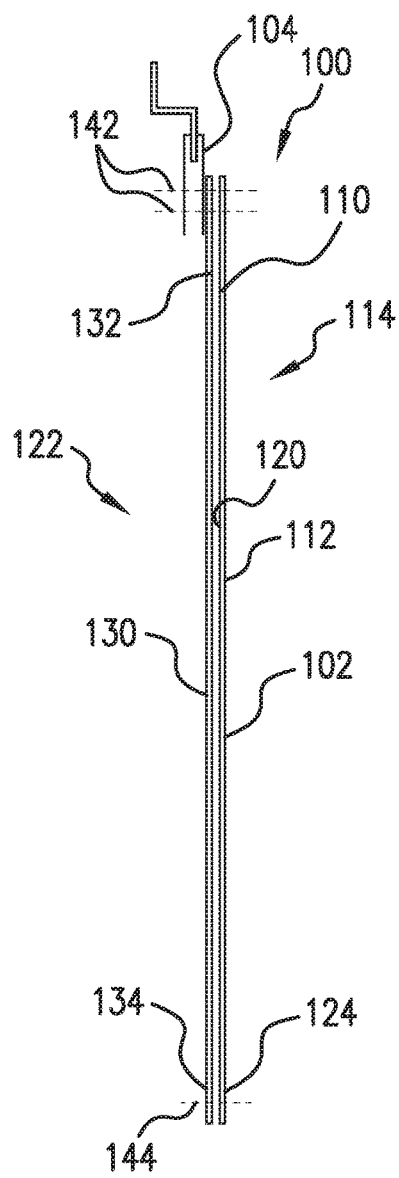
FIG. 1 is a schematic cross-sectional side view of an exemplary airbag assembly in an unfolded position.

Referring now to the drawings, wherein like numerals refer to like parts throughout the several views, FIG. 1 depicts a vehicle airbag assembly 100 including an airbag 102 disposed in an unfolded position relative to a vehicle body 104 with a top portion 110 of the airbag 102 fixed to the vehicle body 104. The airbag 102 is configured for being folded into an intermediate storage position as in FIG. 2 and rolled into a storage position as in FIG. 3. The airbag 102 is configured for actuating from the storage position to a deployed position by inflating as in FIG. 4, unrolling to an intermediate deployed position as in FIG. 5, and unfolding to the deployed position as in FIG. 6.

Figure 6:
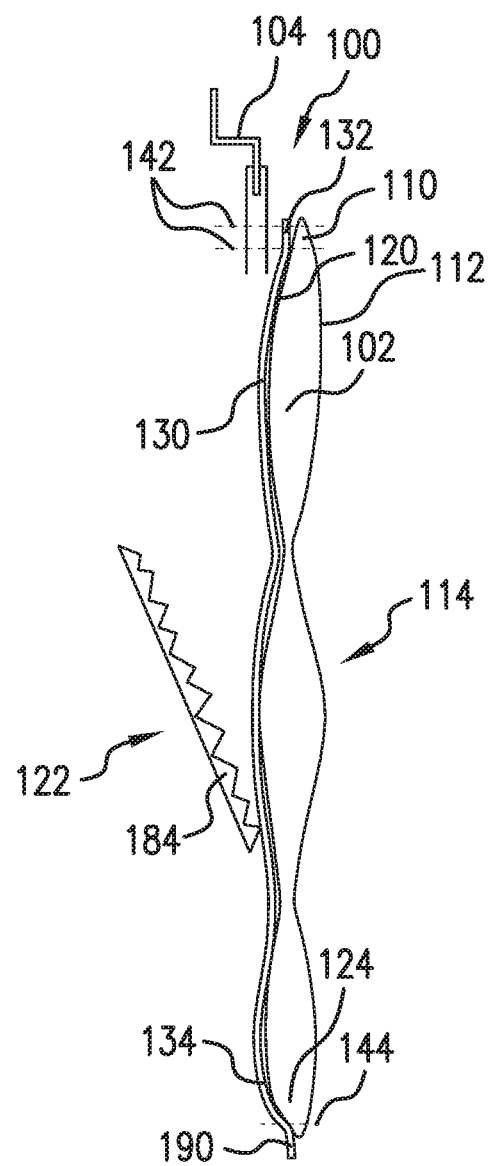
FIG. 6 is a schematic cross-sectional side view of the airbag assembly in a deployed position.

In each of the unfolded position and the deployed position depicted in FIGS. 1 and 6 respectively, the airbag 102 includes an inboard side 112 that faces an interior 114 of the vehicle body and an outboard side 120 that faces an exterior 122 of the vehicle body 104. A bottom portion 124 of the airbag 102 is located on a side of the airbag 102 opposite the top portion 110. A protective fabric layer 130 is adapted to overlay the outboard side 120 of the airbag 102 in the unfolded position and the deployed position.

To overlay the outboard side of the airbag 102, the fabric layer 130 is positioned continuously along the outboard side of the airbag 102 when the airbag 102 is in either the storage position or the unfolded position. The fabric layer 130 includes a top portion 132 fixed to the top portion 110 of the airbag 102 and the vehicle body 104, and a bottom portion 134 fixed to the bottom portion 124 of the airbag 102 at a first location 140 of the fabric layer 130. The top portion 110 of the airbag 102, the top portion 132 of the fabric layer 130, and the vehicle body 104 are fixed to each other with at least one fastener 142 and the bottom portion 124 of the airbag 102 and the bottom portion 134 of the fabric layer 130 are fixed to each other with at least one fastener 144 such that the fabric layer 130 is configured to overlay the outboard side 120 of the airbag 102 permanently in each of the storage position and the deployed position. In the depicted embodiment, each at least one fastener 142, 144 is permanent stitching and will be referred to herein after as "permanent stitching," however other fastening means such as rivets, bolts, adhesives, and alternative stitching forms may be employed as either or each permanent stitching 142, 144 without departing from the present disclosure. Further, by use of the term "permanent" it is meant that the permanent stitching 142, 144 causes the airbag 102 and the fabric layer 130 maintain a fixed relation to each other when the airbag 102 is actuated from the storage position to the deployed position.

Figure 2:
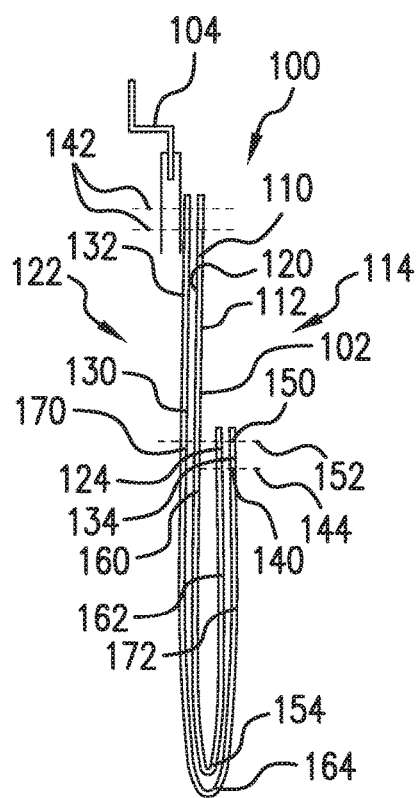
FIG. 2 is a schematic cross-sectional side view of the airbag assembly folded in an intermediate storage position.

As shown in FIG. 2, the fabric layer 130 is in an intermediate storage position that is folded over the airbag 102 in the intermediate storage position, and the fabric layer 130 is connected to the inboard side 112 of the airbag 102 at a second location 150 of the fabric layer 130 with at least one fastener 152. Specifically, the airbag 102 is folded upward toward the top portion 110 of the airbag 102 into the intermediate storage position, forming a folded end portion 154 that separates the airbag 102 into an unfolded section 160 and a folded section 162. Also, the fabric layer 130 is folded over the airbag 102 from the outboard side 120 of the airbag 102 to the inboard side 112 of the airbag 102, upward toward the top portion 110 of the airbag 102 into the intermediate storage position. The fold of the fabric layer 130 forms a folded end portion 164 that aligns with and corresponds to the folded end portion 154 of the airbag 102, and separates the fabric layer 130 into an unfolded section 170 and a folded section 172. In the depicted embodiment, the at least one fastener 152 is temporary stitching and will be referred to herein after as "temporary stitching," however other fastening means such as bolts, temporary adhesives, and alternative temporary stitching forms may be employed as the temporary stitching 152 without departing from the present disclosure. Further, by use of the term "temporary" it is meant that the temporary stitching 152 breaks when the airbag 102 is actuated from the storage position to the deployed position at a time between when the airbag 102 is in the storage position and when the airbag 102 is in the deployed position.

In the intermediate storage position, the airbag 102 is folded such that the bottom portion 124 of the airbag 102 is located at the top portion 110 or between the top portion 110 and the folded end portion 154 along the unfolded section 160 of the airbag 102 and faces the inboard side 112 of the airbag 102. The second location 150 of the fabric layer 130 is connected to the inboard side 112 of the airbag 102 with the temporary stitching 152 at a point beyond the bottom portion 124 of the airbag 102 from the folded end portion 154, between the first location 140 of the fabric layer 130 and the top portion 110 of the airbag 102. The temporary stitching 152 is a temporary fastening configured for being broken by the airbag 102 when the airbag 102 actuates from the storage position to the deployed position such that the second location 150 of the fabric layer 130 is connected to the airbag 102 when the airbag 102 is in the storage position and is not connected to the airbag 102 when the airbag 102 is in the deployed position. The temporary stitching 152 may be tack stitching, including tack stitching formed with even tacking, uneven tacking, diagonal tacking, or tailor's tacking. In another embodiment, the second location 150 of the fabric layer 130 is connected at the vehicle body 104, with the bottom portion 134 of the fabric layer 130 facing the inboard side 112 of the airbag 102.

Figure 7:
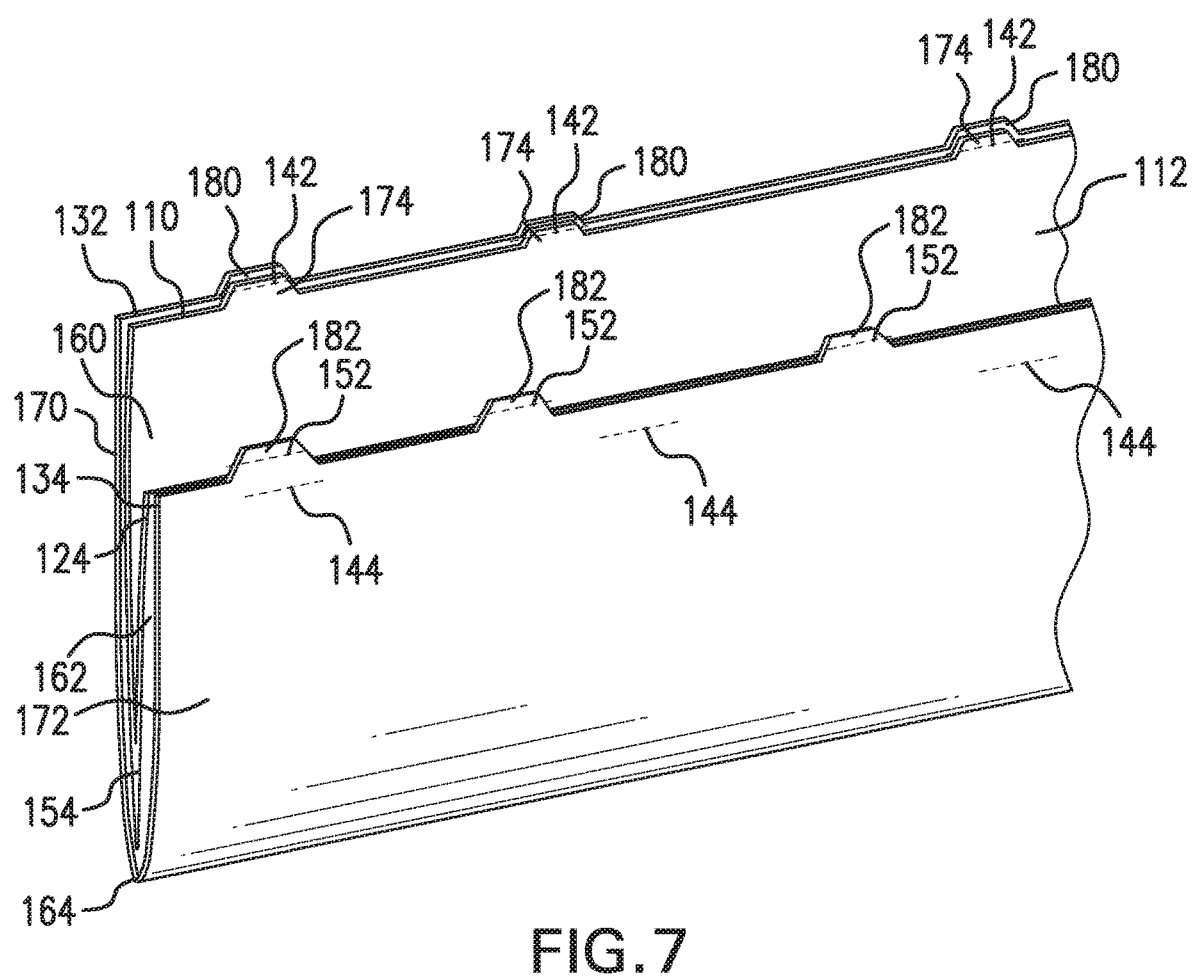
FIG. 7 is a partial perspective view of the airbag assembly.

As shown in FIG. 7, the permanent stitching 142 fixing the top portion 110 of the airbag 102 and the top portion 132 of the fabric layer 130 is directed through tabs 174 on the top portion 110 of the airbag 102 and tabs 180 on the top portion 132 of the fabric layer 130. The tabs 174 on the top portion 110 of the airbag 102 and the tabs 180 on the top portion 132 of the fabric layer 130 are provided in overlapping locations with respect to the vehicle body 104 such that the top portion 110 of the airbag 102 and the top portion 132 of the fabric layer 130 are permanently fixed together through the tabs 174 on the top portion 110 of the airbag 102 and the tabs 180 on the top portion 132 of the fabric layer 130 with the permanent stitching 142. The temporary stitching 152 is directed through tabs 182 on the bottom portion 134 of the fabric layer 130 to the airbag 102, wherein the tabs 182 extend between the bottom portion 124 of the airbag 102 and the top portion 110 of the airbag 102 when the airbag 102 and the fabric layer 130 are respectively in the intermediate storage position. While in the depicted embodiment the at least one fastener 142 is directed through tabs 174, an embodiment of the vehicle airbag assembly 100 features the at least one fastener 142 directed through the airbag 102 instead of the tabs 174, 180, 182 of the airbag 102 and the fabric layer 130.

Figure 3:
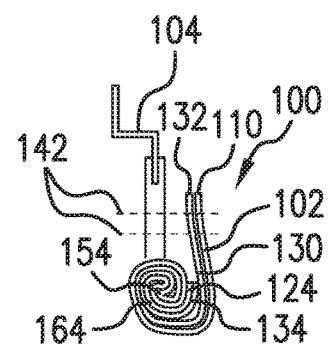
FIG. 3 is a schematic cross-sectional side view of the airbag assembly rolled into a storage position.

As shown in FIG. 3, the airbag 102 is configured into the storage position from the intermediate storage position by rolling the folded end portion 154 of the airbag 102 in an outboard direction of the vehicle body 104 toward the top portion 110 of the airbag 102. With the fabric layer 130 positioned continuously along the outboard side 120 of the airbag 102, the folded end portion 164 of the fabric layer 130 is rolled together with the folded end portion 154 of the airbag 102 in the outboard direction of the vehicle body 104 toward the top portion 110 of the airbag 102.

Figure 4:
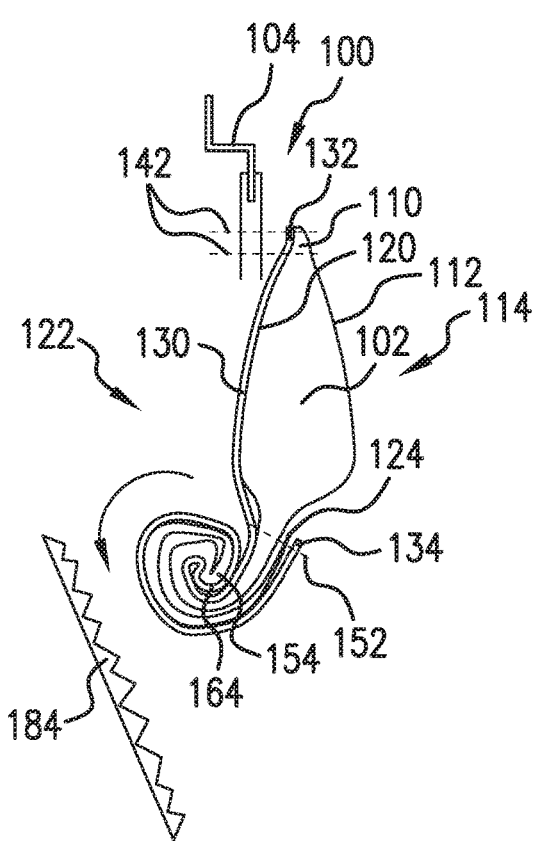
FIG. 4 is a schematic cross-sectional side view of the airbag assembly unrolling from the storage position.

As shown in FIG. 4, the airbag 102 is configured to inflate from the top portion 110 of the airbag 102. Because the temporary stitching 152 pinches the airbag 102 at the second location 150 of the fabric layer 130, the airbag 102 initially inflates between the top portion 110 of the airbag 102 and the temporary stitching 152 when the airbag 102 actuates from the storage position. Notably, because the fabric layer 130 is positioned continuously along the outboard side 120 of the airbag 102, the fabric layer 130 is between the airbag 102 and debris 184 that could otherwise puncture the airbag 102 from an early stage of deployment of the airbag 102. In this manner, the fabric layer 130 protects all of the airbag 102 facing the exterior 122 of the vehicle body 104 from debris 184 beginning at an early stage of deployment of the airbag 102.

Figure 5:
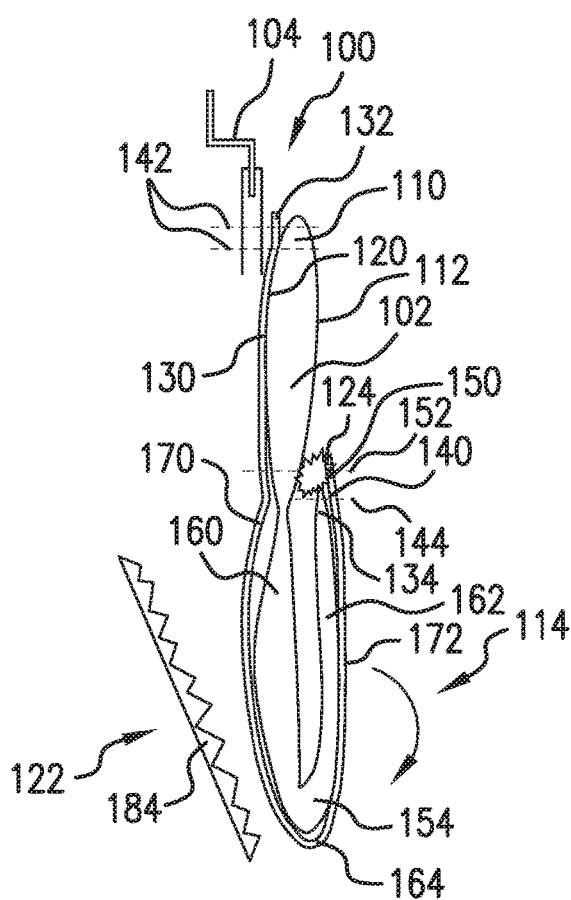
FIG. 5 is a schematic cross-sectional side view of the airbag assembly unrolled from the storage position to an intermediate deployed position.

As the airbag 102 continues to actuate from the storage position to the deployed position, the temporary stitching 152 breaks as in FIG. 5, allowing the airbag 102 to further expand and unfold into the deployed position as in FIG. 6. Specifically, the temporary stitching 152 breaks at least by the time the airbag 102 is in the intermediate deployed position, prior to the airbag 102 fully unfolding. Notably, because the second location 150 where the temporary stitching 152 breaks is located above the bottom portion 124 of the airbag 102 in the intermediate deployed position, the fabric layer 130 covers the bottom portion 124 of the airbag 102 in the deployed position with an overhanging portion 190. Because the fabric layer 130 remains between the airbag 102 and the debris 184 as the airbag 102 unrolls and unfolds into the deployed position, the fabric layer 130 protects the airbag 102 from an early stage of deployment as in FIG. 4 to the deployed position as in FIG. 6.

Figure 8:
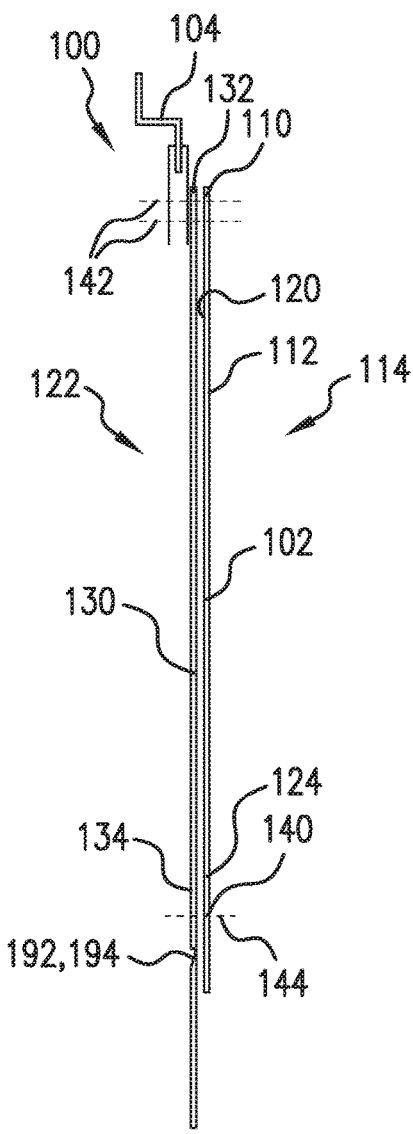
FIG. 8 is a schematic cross-sectional side view of an embodiment of the airbag assembly in an unfolded position.

In an embodiment of the vehicle airbag assembly 100 depicted in FIGS. 8-14, the fabric layer 130 includes a perforation line 192 defined therein, and directed through the fabric layer 130 between the first location 140 at which the fabric layer 130 is fixed to the airbag 102 and the second location 150 at which the fabric layer 130 is fixed. As shown in FIG. 8, perforations in the perforation line 192 are typified by a perforation 194 in the bottom portion 134 of the fabric layer 130 wherein the fabric layer 130 has a reduced thickness, weakening the fabric layer 130 at the perforation 194. Embodiments of the perforation 194 can reduce the thickness of the fabric layer 130 completely to form a hole in the fabric layer 130, or partially to form an indent in the fabric layer 130. The perforation 194 can have an inclined cross-sectional shape taken from a side view as in FIG. 8, a rounded cross-sectional shape, or a square cross-sectional shape. In this manner, the fabric layer 130 is configured to break along the perforation line 192 between the top portion 132 and the bottom portion 134.

Figure 9:
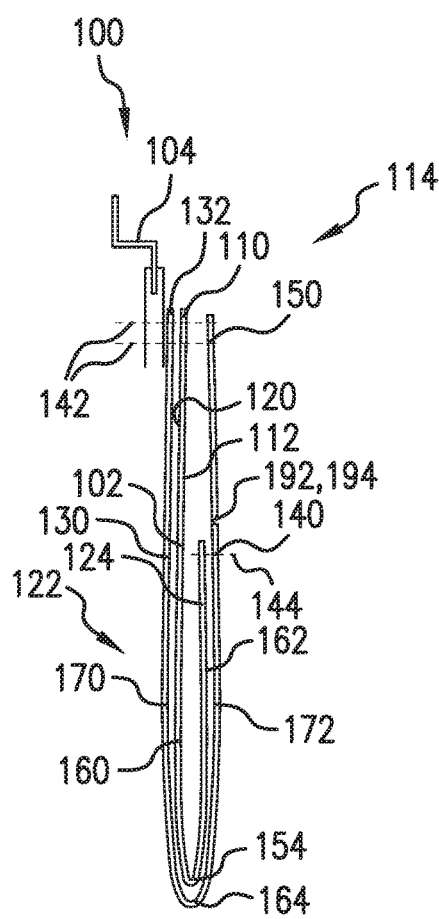
FIG. 9 is a schematic cross-sectional side view of the airbag assembly of FIG. 8 folded in an intermediate storage position.
Figure 10:
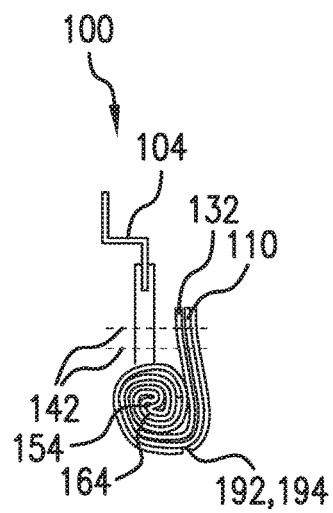
FIG. 10 is a schematic cross-sectional side view of the airbag assembly of FIG. 8 rolled into a storage position.
Figure 11:
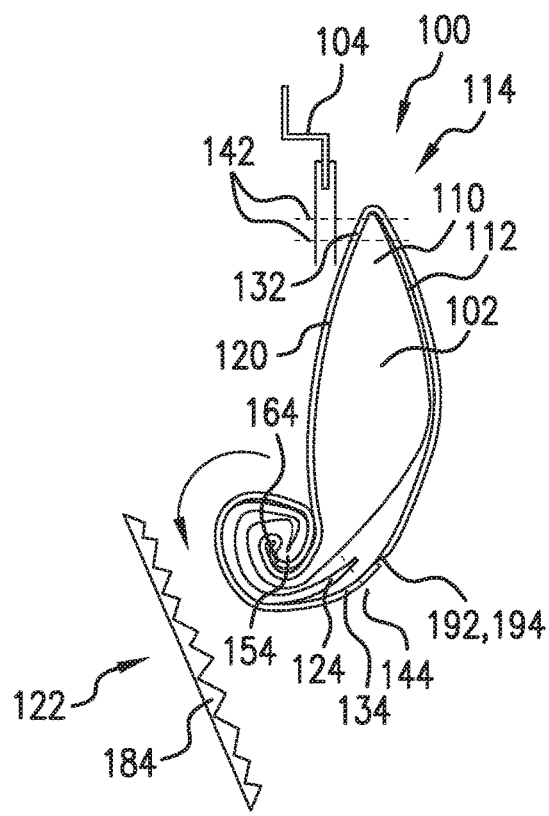
FIG. 11 is a schematic cross-sectional side view of the airbag assembly of FIG. 8 unrolling from the storage position.

As shown in FIG. 9, the second location 150 of the fabric layer 130 is fixed to the vehicle body 104 with the top portion 110 of the airbag 102 and the top portion 132 of the fabric layer 130. In this manner, the bottom portion 134 of the fabric layer 130 is fixed to the top portion 110 of the airbag 102 and the top portion 132 of the fabric layer 130 with the permanent stitching 142. In an embodiment, the second location 150 of the fabric layer 130 is fixed to the inboard side 112 of the airbag 102.

Figure 14:
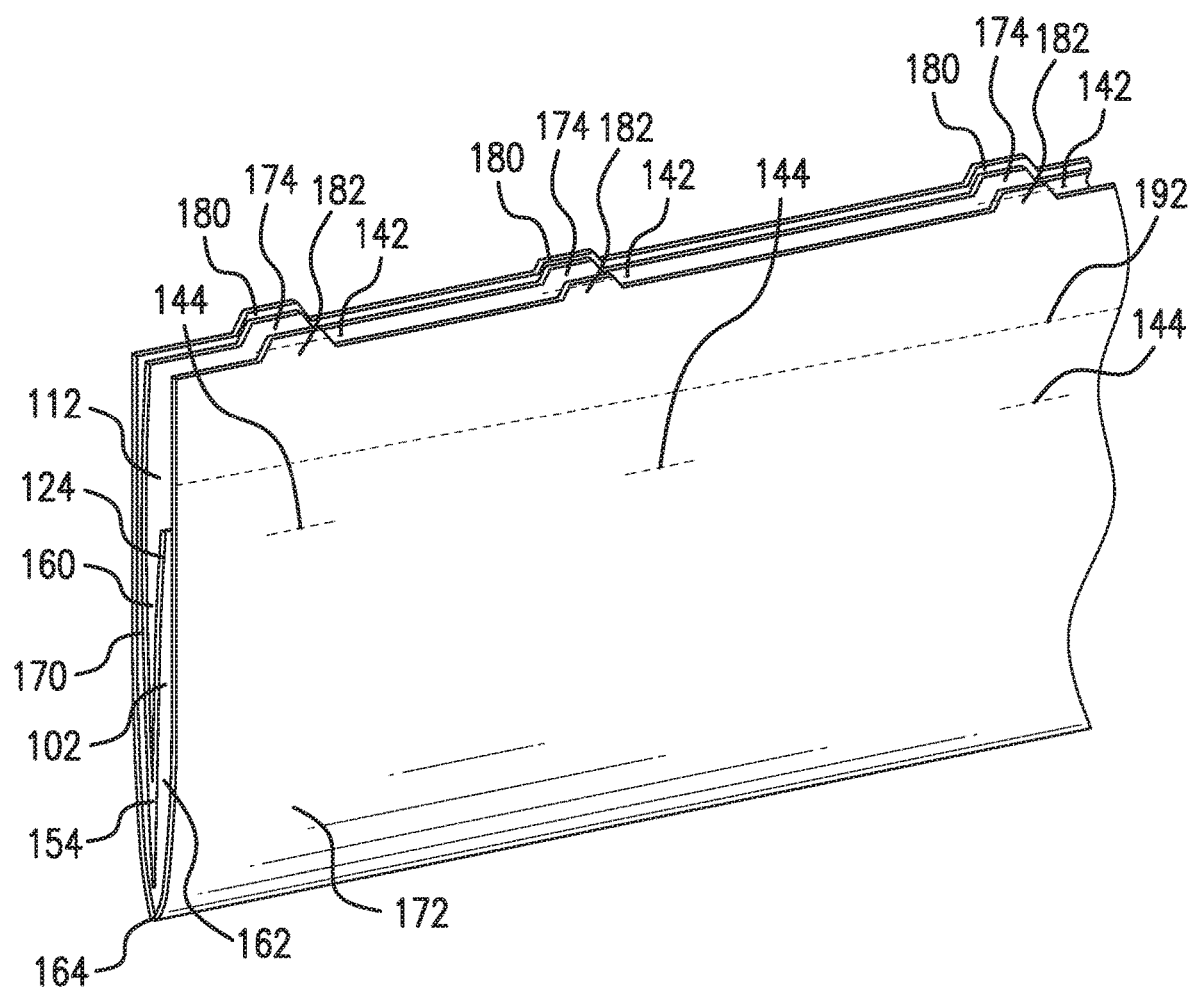
FIG. 14 is a partial perspective view of the airbag assembly of FIG. 8.

As shown in FIG. 14, the perforation line 192 is a dashed line directed between the permanent stitching 142 fixing the top portion 110 of the airbag 102, the top portion 132 of the fabric layer 130, and the bottom portion 134 of the fabric layer 130, and the permanent stitching 144 fixing the bottom portion 124 of the airbag 102 and the bottom portion 134 of the fabric layer 130. The permanent stitching 142 fixing the top portion 110 of the airbag 102, the top portion 132 of the fabric layer 130, the vehicle body 104, and the bottom portion 134 of the fabric layer 130 is directed through the tabs 174 on the top portion 110 of the airbag 102, the tabs 180 on the top portion 132 of the fabric layer 130, and the tabs 182 on the bottom portion 134 of the fabric layer 130.

Figure 12:
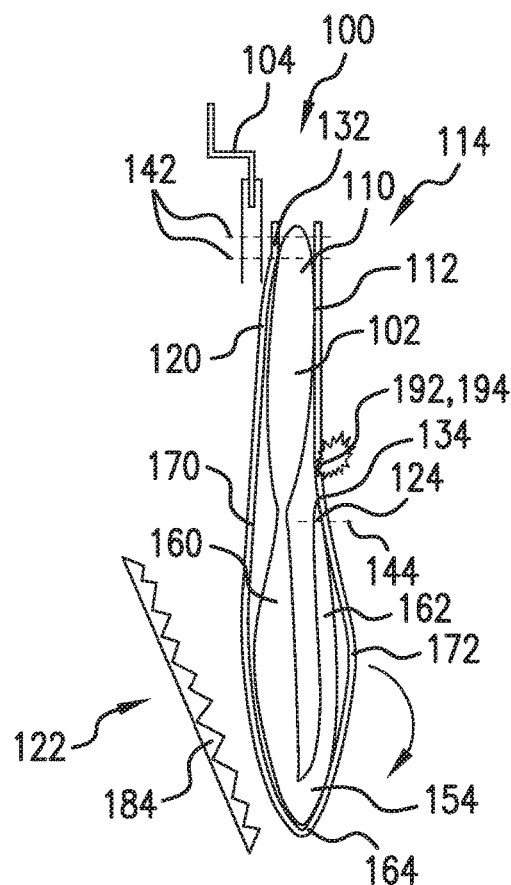
FIG. 12 is a schematic cross-sectional side view of the airbag assembly of FIG. 8 unrolled from the storage position to an intermediate deployed position.
Figure 13:
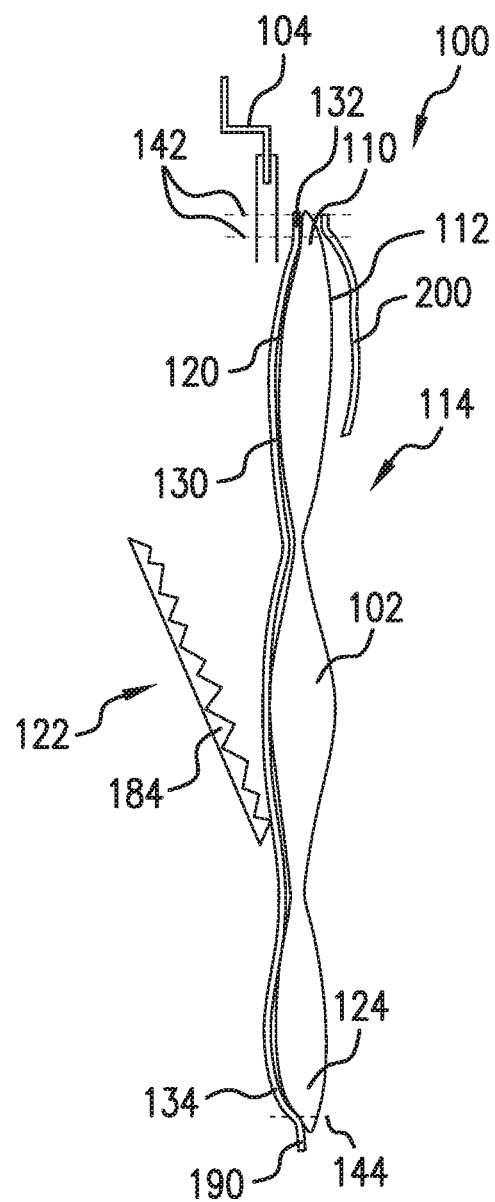
FIG. 13 is a schematic cross-sectional side view of the airbag assembly of FIG. 8 in a deployed position.

As shown in FIG. 12, the perforation 194 provides a weakened section of the fabric layer 130 designed to break when the airbag 102 actuates from the storage position to the deployed position. As shown in FIG. 13, the fabric layer 130 breaking along the perforation line 192 results in a section of the fabric layer between the first location 140 and the second location 150 to split, forming the overhanging portion 190 and a detached portion 200. Because the perforation line 192 is located above the bottom portion 124 of the airbag 102 in the intermediate storage position as in FIG. 9, the overhanging portion 190 extends beyond the bottom portion 124 of the airbag 102 such that the fabric layer 130 covers all of the airbag 102 facing the exterior 122 of the vehicle body 104. When the airbag assembly 100 is provided as a side airbag assembly or curtain airbag assembly, the bottom portion 124 of the airbag 102 and the overhanging portion 190 cover a corresponding vehicle window (not shown) in the deployed position such that the airbag 102 and the overhanging portion 190 cover a door trim (not shown) of the window, preventing glass from the window from further entering the vehicle body 104 in the event of a collision.

Figure 15:
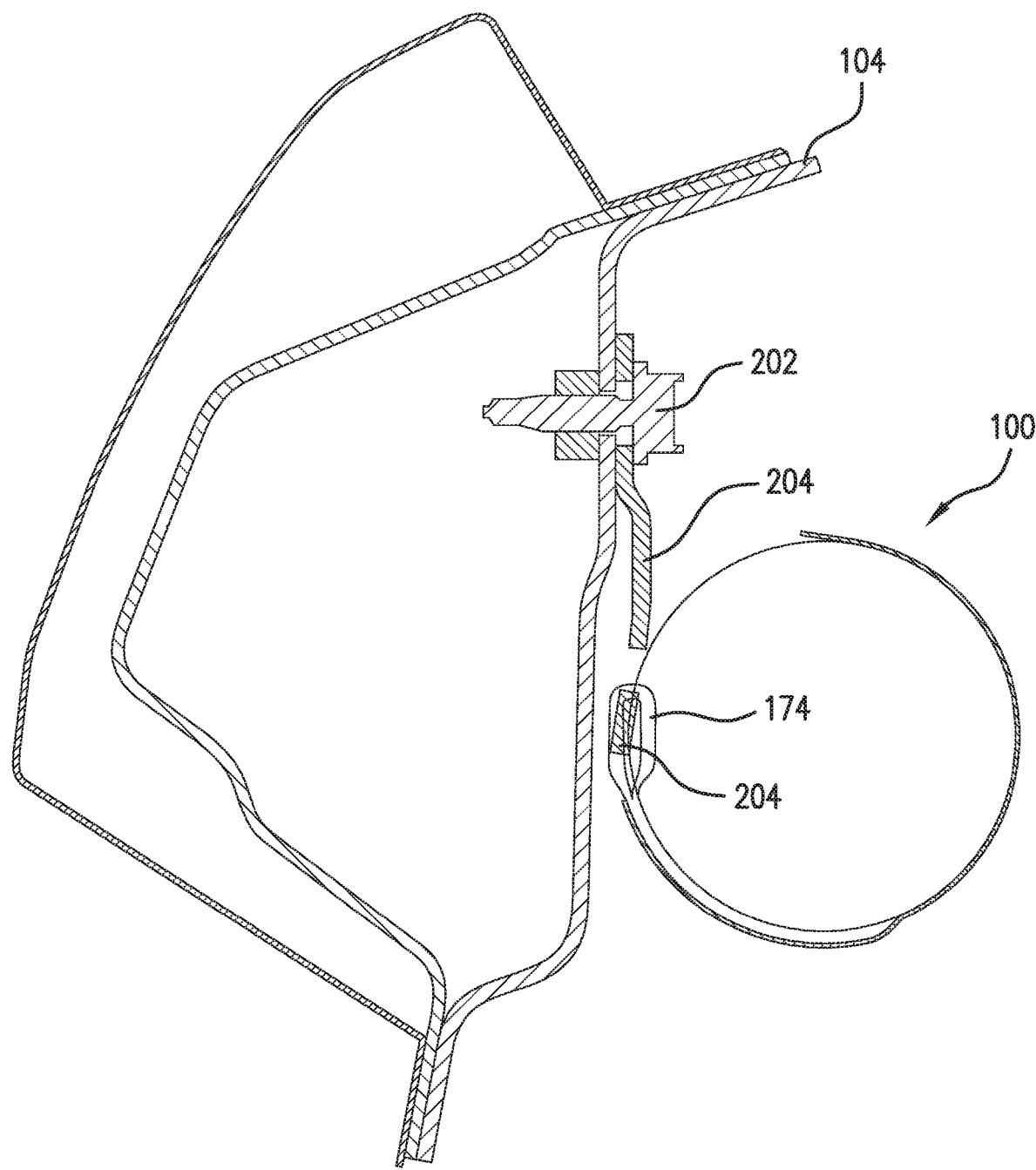
FIG. 15 is a partial cross-sectional view of an exemplary airbag assembly fixed to a vehicle body.

As shown in FIG. 15, the vehicle airbag assembly 100 is fixed to the vehicle body 104 with a bolt 202 and a mounting bracket 204. Specifically, the airbag assembly 100 is provided in the storage position with the tabs 174 on the top portion 110 of the airbag 102 and the tabs 180 on the top portion 132 of the fabric layer 130 sewn to the mounting bracket 204. The bolt 202 fixes the mounting bracket 204 to the vehicle body 104, thereby fixing the airbag assembly 100 to the vehicle body 104. With this construction, the top portion 110 of the airbag 102 and the top portion 132 of the fabric layer 130 are fixed together with the permanent stitching 142, and the airbag 102 and the fabric layer 130 are together connected to the vehicle body 104. In an alternative embodiment wherein the tabs 182 on the bottom portion 134 of the fabric layer 130 are fixed to the tabs 174 on the top portion 110 of the airbag 102 and the tabs 180 on the top portion 132 of the fabric layer 130 with the permanent stitching 142, the tabs 182 on the bottom portion 134 of the fabric layer 130 are also sewn onto the mounting bracket 204.

A method of providing the vehicle airbag assembly 100 includes fixing the top portion 110 of the airbag 102 to the vehicle body 104, fixing the top portion 132 of the fabric layer 130 to the vehicle body 104 such that the fabric layer 130 faces the outboard side 120 of the airbag 102 with respect to the vehicle body 104, and fixing the bottom portion 124 of the airbag 102 to the fabric layer 130. The method also includes folding the bottom portion 124 of the airbag 102 upward toward the top portion 110 of the airbag 102, forming the folded end portion 154 of the airbag 102 opposite the top portion 110 of the airbag 102. The bottom portion 134 of the fabric layer 130 is folded over the folded end portion 154 of the airbag 102, forming the folded end portion 164 of the fabric layer 130 opposite the top portion 132 of the fabric layer 130. The bottom portion 134 of the fabric layer 130 is connected to at least one of the inboard side 112 of the airbag 102 and the vehicle body 104. The folded end portion 154 of the airbag 102 and the folded end portion 164 of the fabric layer 130 are together rolled in an outboard direction of the vehicle body 104 toward the top portion 110 of the airbag 102.

The method also includes fixedly connecting the bottom portion 134 of the fabric layer 130 to the top portion 110 of the airbag 102 and forming at least one perforation 194 in the fabric layer 130 between the bottom portion 134 of the fabric layer 130 and the second location 150, where the fabric layer 130 is fixed to the bottom portion 124 of the airbag 102. In an embodiment, the method includes releasably connecting the bottom portion 134 of the fabric layer 130 to the inboard side 112 of the airbag 102.

According to another aspect, a method of providing a vehicle airbag assembly 100 includes fixing the top portion 110 of the airbag 102 to the vehicle body 104 and folding the bottom portion 124 of the airbag 102 upward toward the top portion 110 of the airbag 102. This places the airbag 102 in the intermediate storage position between the storage position and the unfolded position, and forms the folded end portion 154 of the airbag 102 opposite the top portion 110 of the airbag 102 with respect to an unfolded section 160 of the airbag 102 such that the bottom portion 124 of the airbag 102 is located between the top portion 110 of the airbag 102 and the folded end portion 154 of the airbag 102 and faces the inboard side 112 of the airbag.

The method also includes fixing the top portion 132 of the fabric layer 130 to the vehicle body 104 such that the fabric layer 130 overlays the outboard side 120 of the airbag 102 in the unfolded position, and folding the bottom portion 134 of the fabric layer 130 over the folded end portion 154 of the airbag 102 and toward the top portion 110 of the airbag 102. This places the fabric layer 130 in the intermediate storage position between the storage position and the unfolded position, and forms the folded end portion 164 of the fabric layer 130 corresponding with the folded end portion 154 of the airbag 102 such that the bottom portion 134 of the fabric layer 130 extends at least as far as the bottom portion 124 of the airbag 102. The folded end portion 154 of the airbag 102 and the folded end portion 164 of the fabric layer 130 are rolled together in an outboard direction of the vehicle body 104 toward the top portion 110 of the airbag 102. After folding the bottom portion 134 of the fabric layer 130, the bottom portion 134 of the fabric layer 130 is connected to at least one of an inboard side 112 of the airbag 102 and the vehicle body 104.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle airbag assembly for a vehicle body, comprising:
    an airbag having a storage position and an unfolded position, in the unfolded position the airbag features an inboard side facing an interior of the vehicle body, an outboard side facing an exterior of the vehicle body, a top portion fixed to the vehicle body, and a bottom portion located on a side of the airbag opposite the top portion; and
    a fabric layer adapted to overlay the outboard side of the airbag in the unfolded position, the fabric layer including a top portion and a bottom portion located on an opposite side of the top portion, the top portion of the fabric layer fixed to the top portion of the airbag,
    wherein when in both the storage position and the unfolded position the bottom portion of the fabric layer is fixed at a first location to the airbag, and when in the storage position the bottom portion of the fabric layer is connected at a second location to at least one of the airbag and the vehicle body.

2. The vehicle airbag assembly of claim 1, wherein the fabric layer overlays the airbag such that the fabric layer is positioned continuously along the outboard side of the airbag when the airbag is either in the storage position or in the unfolded position.

3. The vehicle airbag assembly of claim 1, wherein when the airbag is in an intermediate storage position between the storage position and the unfolded position the bottom portion of the airbag is folded upward toward the top portion of the airbag, forming a folded end portion located opposite the top portion of the airbag, and in the intermediate storage position the bottom portion of the airbag is located at the top portion of the airbag or between the top portion of the airbag and the folded end portion of the airbag and faces the inboard side of the airbag.

4. The vehicle airbag assembly of claim 3, wherein to configure the airbag into the storage position from the intermediate storage position, the folded end portion of the airbag is rolled in an outboard direction of the vehicle body toward the top portion of the airbag.

5. The vehicle airbag assembly of claim 4, wherein when the airbag is in the intermediate storage position, the fabric layer is folded over the folded end portion of the airbag, forming a folded end portion of the fabric layer corresponding with the folded end portion of the airbag.

6. The vehicle airbag assembly of claim 5, wherein when to configure the airbag into the storage position from the intermediate storage position, the folded end portion of the airbag and the folded end portion of the fabric layer are together rolled in the outboard direction of the vehicle body toward the top portion of the airbag.

7. The vehicle airbag assembly of claim 1, wherein the top portion of the airbag and the top portion of the fabric layer are fixed together and the airbag and the fabric layer are together connected to the vehicle body.

8. The vehicle airbag assembly of claim 1, wherein the bottom portion of the fabric layer is fixed at the first location to the airbag with stitching.

9. The vehicle airbag assembly of claim 1, wherein when the airbag is in the storage position, the bottom portion of the fabric layer is connected at the second location to the inboard side of the airbag, and when the airbag is actuated to a deployed position, the bottom portion of the fabric layer is not connected at the second location to the inboard side of the airbag.

10. The vehicle airbag assembly of claim 9, wherein when the airbag is in the storage position, the bottom portion of the fabric layer is connected at the second location to the inboard side of the airbag with a temporary fastening configured for being broken when the airbag actuates from the storage position to the deployed position.

11. The vehicle airbag assembly of claim 1, wherein the bottom portion of the fabric layer is connected at the second location to the top portion of the airbag, and the fabric layer has at least one perforation between the fabric layer at the first location fixed to the airbag and the connection of the fabric layer at the second location to the vehicle body.

12. The vehicle airbag assembly of claim 1, wherein the bottom portion of the fabric layer is connected at the second location to the inboard side of the airbag, and the fabric layer has at least one perforation between the connection of the fabric layer at the first location to the airbag and the connection of the fabric layer at the second location to the inboard side of the airbag.

* * * * *